(12) United States Patent
Kahl

(10) Patent No.: US 7,641,214 B2
(45) Date of Patent: Jan. 5, 2010

(54) ENERGY-ABSORBING TRAILER HITCH RECEIVER

(75) Inventor: Donald Kahl, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 580 days.

(21) Appl. No.: 11/432,749

(22) Filed: May 11, 2006

(65) Prior Publication Data

US 2007/0262564 A1 Nov. 15, 2007

(51) Int. Cl.
*B60D 1/00* (2006.01)

(52) U.S. Cl. ............ 280/446.1; 280/449; 280/450; 280/451; 280/486

(58) Field of Classification Search .......... 188/374, 188/377; 267/140.11, 140.6, 140.7; 280/446.1, 280/449, 450, 451, 455, 486
See application file for complete search history.

(56) References Cited

U.S. PATENT DOCUMENTS

| | | | | |
|---|---|---|---|---|
| 3,164,265 A | * | 1/1965 | Price | 213/64 |
| 3,246,771 A | * | 4/1966 | Gray | 213/22 |
| 3,945,662 A | * | 3/1976 | Murase et al. | 280/777 |
| 3,950,011 A | * | 4/1976 | Yamanaka | 280/432 |
| 3,993,352 A | * | 11/1976 | Yamanaka | 298/20 R |
| 4,109,367 A | * | 8/1978 | Richard, Jr. | 29/436 |
| 5,013,059 A | * | 5/1991 | Goettker | 280/446.1 |
| 5,082,311 A | * | 1/1992 | Melotik | 280/777 |
| 5,380,030 A | * | 1/1995 | Gullickson | 280/486 |
| 6,834,879 B1 | * | 12/2004 | Lorman | 280/506 |
| 6,896,303 B1 | * | 5/2005 | Mohr | 293/117 |
| 7,290,783 B2 | * | 11/2007 | Dornbos | 280/495 |
| 7,334,357 B1 | * | 2/2008 | Altheide | 37/231 |

FOREIGN PATENT DOCUMENTS

JP 5-3050 1/1993
JP 08-301028 11/1996

* cited by examiner

*Primary Examiner*—Lesley D Morris
*Assistant Examiner*—Daniel Yeagley
(74) *Attorney, Agent, or Firm*—Gifford, Krass, Sprinkle, Anderson & Citkowski, P.C.

(57) ABSTRACT

An energy-absorbing trailer hitch assembly is provided that includes a receiver tube and an insertion tube. The receiver tube is typically fixedly attached to a motor vehicle and has a set of apertures that affords for a pin to pass therethrough. The tube also has a set of slots adjacent to the apertures, with protrusions between each aperture and its adjacent slot. The insertion tube serves as a trailer hitch and has a set of apertures that align with the set of apertures in the receiver tube. Placement of the insertion tube within the receiver tube affords for a pin to pass through and be held within said apertures. In this manner a trailer may be attached to the trailer hitch and pulled by the motor vehicle. When the trailer is impacted, for example by a rear-end collision, deformation of the pin and/or the protrusions of the receiver tube allow the pin to travel in a forward direction, thereby absorbing energy from the collision. A second embodiment of the invention provides for an energy-absorbing trailer hitch assembly wherein the apertures, slots and protrusions therebetween are located within the insertion tube instead of the receiver tube.

11 Claims, 3 Drawing Sheets

ENERGY-ABSORBING TRAILER HITCH RECEIVER

FIELD OF THE INVENTION

The present invention relates to a trailer hitch receiver, in particular to an energy-absorbing trailer hitch receiver.

BACKGROUND OF THE INVENTION

In order to assist a user of a motor vehicle in transporting equipment, tools, supplies and other various items, a motor vehicle may have an attached trailer hitch assembly for the purpose of pulling a trailer. A typical trailer hitch assembly consists of a trailer hitch receiver tube and a trailer hitch tube inserted and locked therein. By inserting and locking the trailer hitch tube within the trailer hitch receiver tube, a trailer can be attached to the trailer hitch and used to transport various items, for example those mentioned above.

Unlike the energy-dampening capabilities of rear bumpers produced today, a trailer hitch assembly (and the frame it is attached to) must absorb the energy of a rear-end collision experienced by a trailer being pulled by a motor vehicle. Without the capability of the trailer hitch assembly to absorb energy from the rear-end collision, significant damage to the motor vehicle can occur. Thus there is a need for a trailer hitch assembly that absorbs the energy from an impact to the rear of a trailer attached to a motor vehicle.

SUMMARY OF THE INVENTION

An energy-absorbing trailer hitch assembly is provided that includes a receiver tube and an insertion tube. The receiver tube has a set of apertures that affords for a pin to pass therethrough. The tube also has a set of slots adjacent to the apertures, with protrusions between each aperture and its adjacent slot. The insertion tube serves as a trailer hitch tube and has a set of apertures that align with the set of apertures in the receiver tube. Placement of the insertion tube within the receiver tube affords for a pin to pass through and be held within said apertures. In this manner a trailer may be attached to the trailer hitch tube and thereby pulled by the motor vehicle. When the trailer is impacted, for example by a rear-end collision, deformation of the pin and/or the protrusions of the receiver tube allow the pin to travel in a forward direction, thereby absorbing energy from the collision. A second embodiment of the invention provides for an energy-absorbing trailer hitch assembly wherein the apertures, slots and protrusions therebetween are located within the insertion tube instead of the receiver tube.

DETAILED DESCRIPTION OF THE INVENTION

Figure 1:
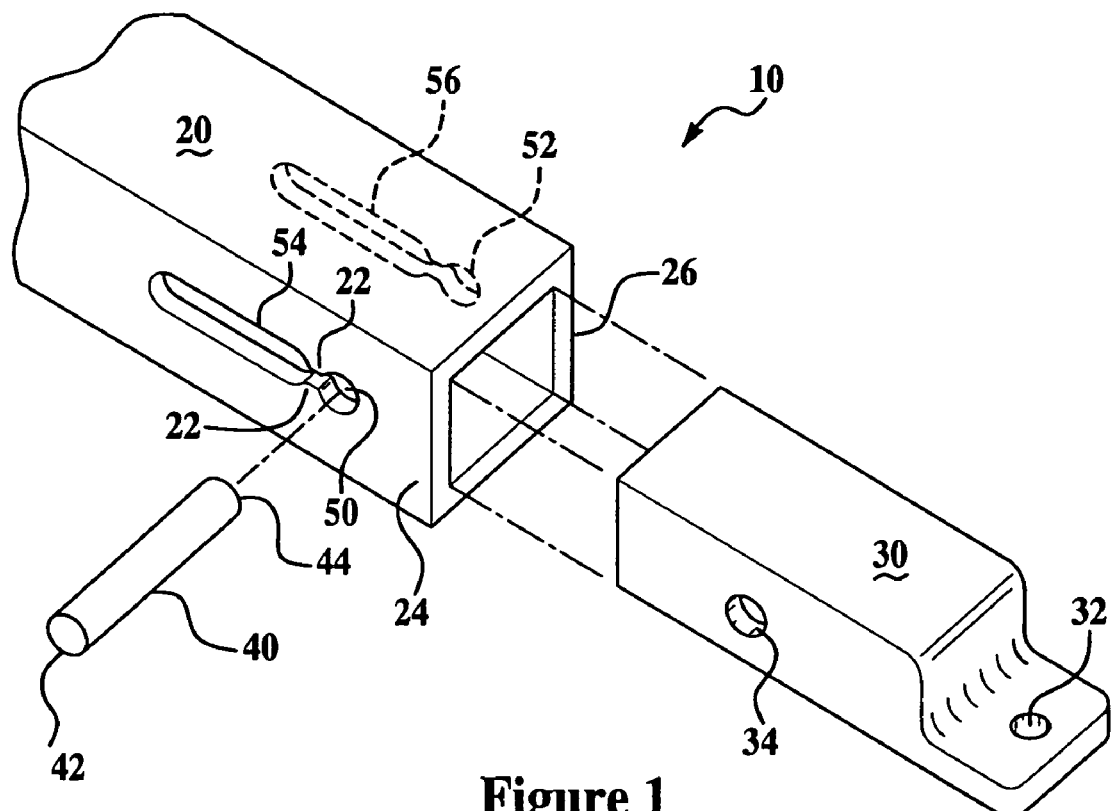
FIG. 1 shows an exploded perspective view of a first embodiment of an energy-absorbing trailer hitch assembly.

In accordance with a first embodiment of the invention, an energy-absorbing trailer hitch assembly 10 consists of a trailer hitch receiver tube 20, a trailer hitch tube 30 and a pin 40 (FIG. 1). The receiver tube 20 is fixedly attached to a motor vehicle (not shown). Receiver tube 20 has a first aperture 50 and a second aperture 52 opposite the first aperture 50. Hitch receiver 20 also has a first slot 54 and a second slot 56 opposite the first slot 54. For illustrative purposes only, first slot 54 and second slot 56 are shown as horizontal. In addition, it is appreciated that FIG. 1 teaches that the first slot 54 and the second slot 56 each have a pair of oppositely disposed parallel edges, and the generally parallel edges extend in a longitudinal direction of the receiver tube 20. In the alternative, first slot 54 and second slot 56 are not horizontal. Between the first aperture 50 and the first slot 54 is at least one protrusion 22. Likewise, between the second aperture 52 and the second slot 56 is at least one protrusion 22. It is further appreciated that there is an opening within the wall of the receiver tube 20 between the first aperture 50 and the first slot 54, and between the second aperture 52 and the second slot 56. Stated differently, the at least one protrusion 22 creates a narrow passage between a given aperture and slot, the passage having a width that is less than a width of the slot. The shape and number of the protrusions 22 shown in FIG. 1 are for illustrative purposes only. For example, the shape of a protrusion can be in the form of a triangle or rectangle and only one protrusion need be present between the slot and the aperture.

As depicted in FIG. 1, first aperture 50 and first slot 54 are contained within a first side 24, and second aperture 52 and second slot 56 are contained within a second side 26, with the first side 24 parallel to the second side 26. In the alternative, the first side 24 and the second side 26 are not parallel to each other. For example, the first aperture 50, second aperture 52, first slot 54 and second slot 56, along with protrusions 22, can be contained within the wall of a cylindrical tube or within opposing walls of any polygonal-shaped tube. FIG. 1 also depicts first aperture 50, second aperture 52, first slot 54 and second slot 56 contained within the vertical sides 24 and 26 of the receiver tube 20. In the alternative, the apertures and slots could be contained within the horizontal sides of the receiver tube 20.

The trailer hitch tube 30 includes an aperture 32 which receives a trailer attachment device, for example a trailer hitch ball (not shown). Hitch tube 30 also includes aperture 34 which extends through the entire hitch tube 30. The aperture 34 is positioned such that the aperture 34 registers with the first aperture 50 and the second aperture 52. In this manner a pin 40 is inserted through the first aperture 50, aperture 34 and the second aperture 52, thereby affording hitch tube 30 to be securely attached to the receiver tube 20 during the operation of the motor vehicle and the pulling of a trailer (not shown).

A pin 40 has a first end 42 and a second end 44 oppositely disposed therefrom. Pin 40 as depicted in FIG. 1 is of a cylindrical shape. In the alternative, pin 40 can be of a shape such that the cross section is an oval or any polygon. The pin 40 is typically manufactured from a material that is more deformable than the material of construction for receiver tube 20 and typically has means for holding said pin in place during use (not shown).

Figure 2:
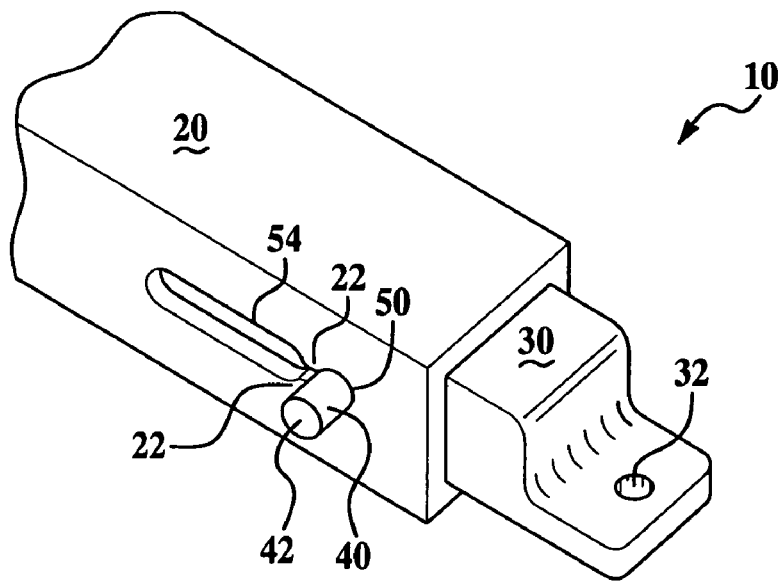
FIG. 2 shows an assembled perspective view of an energy-absorbing trailer hitch assembly shown in FIG. 1.

FIG. 2 shows a perspective view of an assembled energy-absorbing trailer hitch assembly 10. The hitch tube 30 is inserted within the receiver tube 20 and the pin 40 inserted through the first aperture 50, the aperture 34 of the hitch tube 30, and the second aperture 52. By inserting pin 40 and attaching the hitch tube 30 to the hitch receiver tube 20 in this manner, the trailer hitch assembly 10 is used to pull a trailer behind a motor vehicle.

Figure 3:
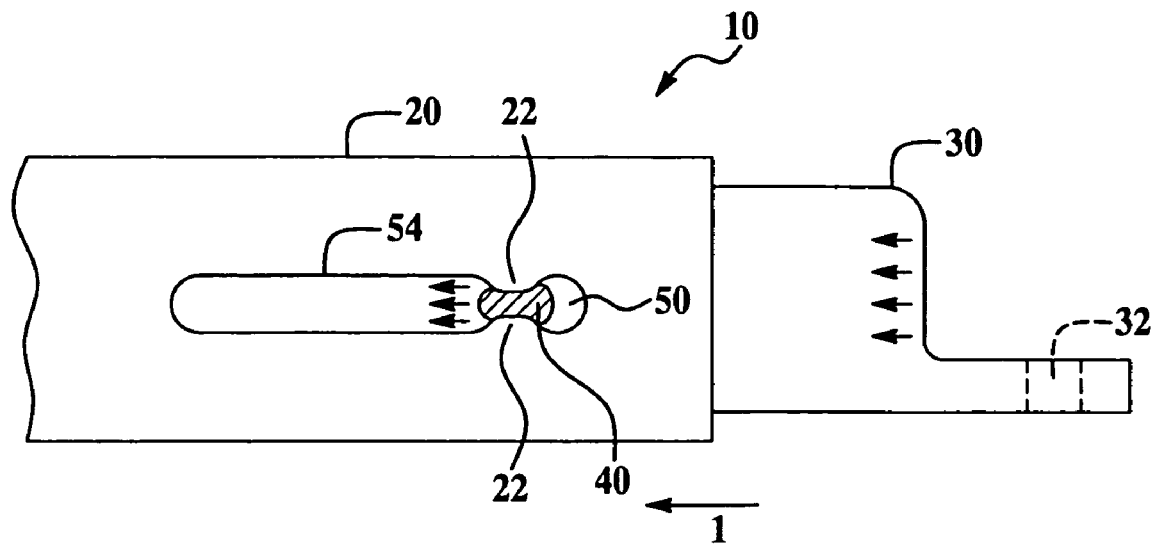
FIG. 3 shows a side view of an energy-absorbing trailer hitch assembly shown in FIG. 2 after impact.

FIG. 3 represents a side view of the hitch receiver assembly 10 after the hitch 30 has been subjected to a rear-end type impact. The embodiment shown in FIG. 3 provides for the deformation of the pin 40 when the hitch tube 30 is subjected to an impact force in a first direction 1. When the pin 40 is manufactured from a more deformable material than the receiver tube 20, the pin 40 deforms. Upon deformation of the pin 40, the hitch tube 30 is allowed to travel in the first direction 1. If the rear-end collision is severe, the pin 40 will travel past the at least one protrusion 22 and into the first slot 54 and the second slot 56. Also, more than one set of protrusions can be present along a slot in order to provide a series of energy-absorbing events. In this manner receiver tube 20, hitch tube 30 and pin 40 afford for an energy-absorbing trailer hitch assembly.

Figure 4:
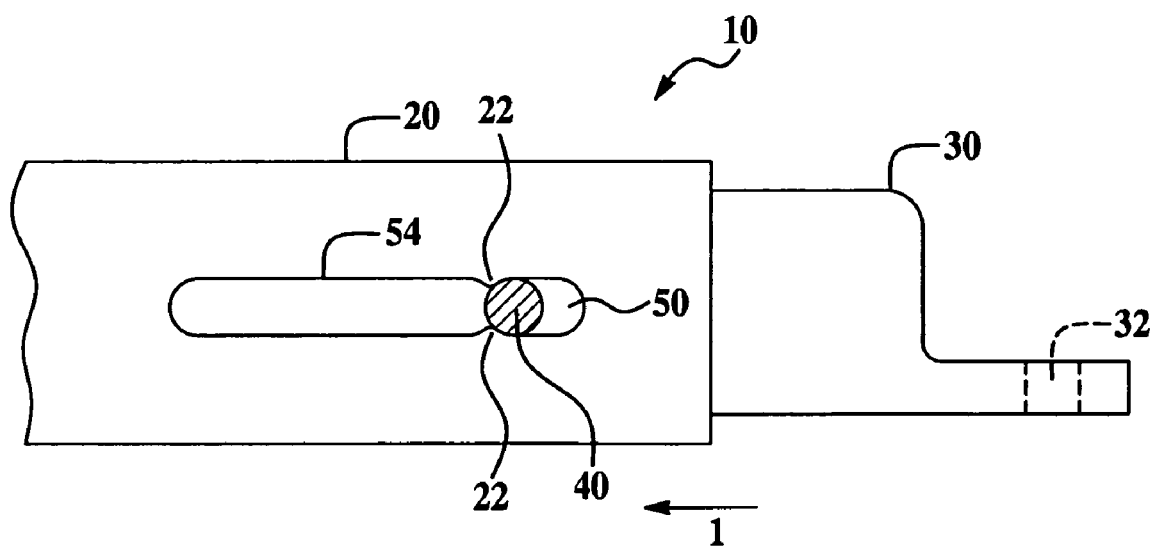
FIG. 4 shows a side view of a second embodiment of an energy-absorbing trailer hitch assembly.

The hitch receiver tube 20, hitch tube 30 and pin 40 are manufactured from materials known to one skilled in the art, illustratively including steels, aluminum alloys and high strength plastics. In addition, the materials chosen for each component can afford for the protrusions 22 to deform during a rear-end collision instead of the pin 40 (FIG. 4), or in the alternative both the protrusions 22 and the pin 40 deform.

Figure 5:
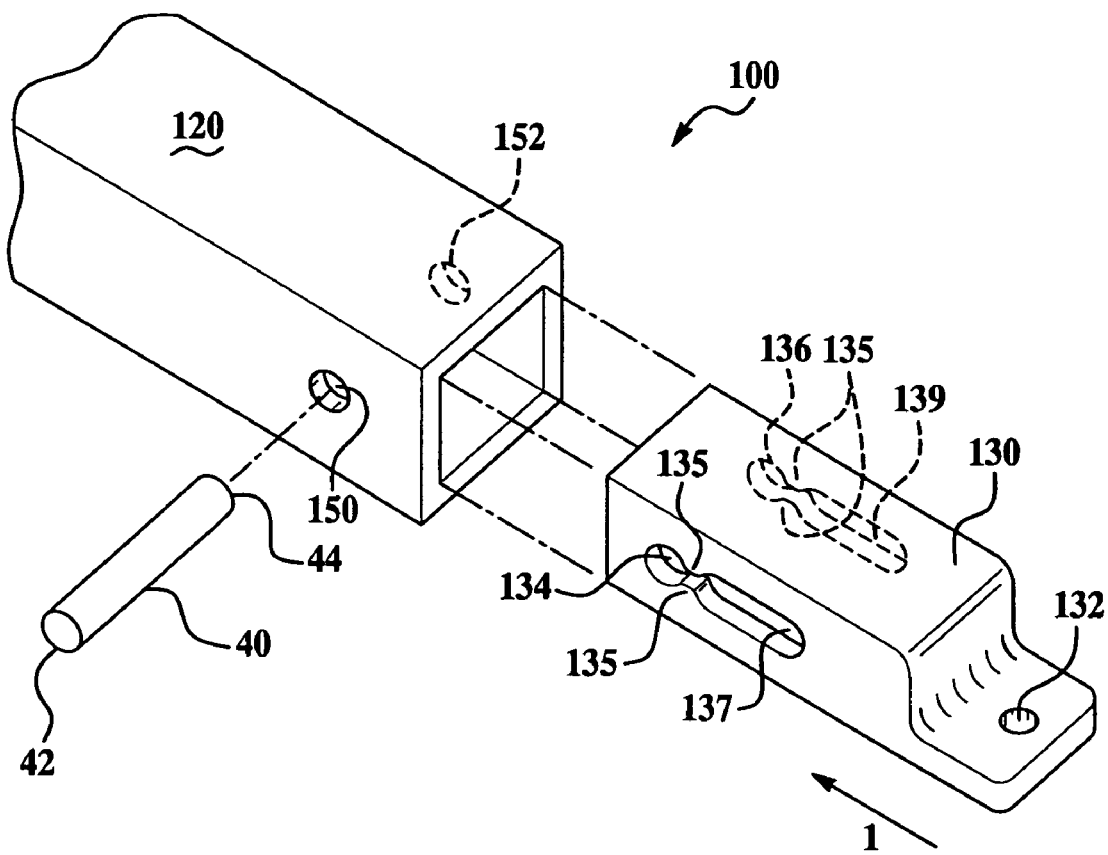
FIG. 5 shows an exploded perspective view of a second embodiment of an energy-absorbing trailer hitch assembly.

In accordance with a second embodiment of the invention, FIG. 5 shows an energy-absorbing trailer hitch assembly 100. This embodiment is similar to the embodiment represented in FIGS. 1 through 3, except that the energy-absorbing components are comprised from the pin 40 and the trailer hitch tube 130. In addition to a trailer attachment device aperture 132, hitch tube 130 has a first aperture 134, a second aperture 136, a first slot 137 with at least one protrusion 135 and a second slot 139 with at least one protrusion 135. The first aperture 134 and second aperture 136 register with a first aperture 150 and a second aperture 152 contained within trailer hitch receiver tube 120.

Insertion of hitch tube 130 into receiver tube 120 affords for pin 40 to pass through apertures 150, 134, 136 and 152. In this manner hitch tube 130 is attached to receiver tube 120 and the energy-absorbing trailer hitch receiver assembly 100 is used to pull a trailer behind a motor vehicle. Upon a rear-end collision involving a trailer pulled by a motor vehicle using the energy-absorbing trailer hitch assembly 100, deformation of the pin 40 and/or protrusions 135 absorbs energy received by the trailer by affording the movement of the hitch tube 130 in the direction 1.

Figure 6:
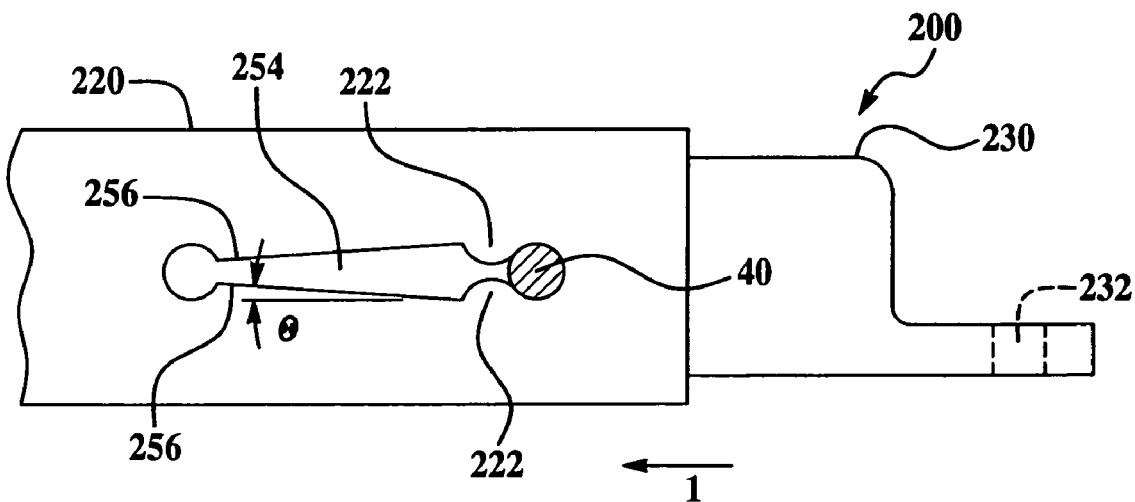
FIG. 6 shows a side view of a third embodiment of an energy-absorbing trailer hitch assembly.

In accordance with yet another embodiment of the invention, FIG. 6 shows an energy-absorbing trailer hitch assembly 200. This embodiment is similar to the embodiment represented in FIGS. 1 through 5, except that the energy-absorbing components are comprised from the pin 40 and the receiver tube 220 with an angled slot 254. Upon impact of the trailer hitch tube 230 from a rear end type collision force, the tube 230 and pin 40 travel in a first direction 1 causing protrusions 222 and/or pin 40 to deform and absorb energy. If the force is large enough, pin 40 continues to travel in the axial first direction 1 and is subjected to a continual increasing resistance from the angled slot 254 afforded by the decrease in width opening of the slot 254 along said direction. The angle slot 254 has ramps 256 wherein the slot surfaces in the axial direction are offset from a horizontal plane by an angle θ. In the alternative, the ramps 256 are offset from a non-horizontal plane by an angle θ. The angle of offset θ is varied for different towing loads in order to optimize the energy absorbing capability of the trailer hitch assembly 200. In this manner the trailer hitch assembly 200 absorbs energy from a rear end type collision.

The invention is not restricted to the illustrative examples described above. The examples are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

The invention claimed is:

1. An energy-absorbing trailer hitch receiver comprising:
   a tube having a first aperture and a second aperture opposite said first aperture;
   said tube also having a first slot and a second slot opposite said first slot;
   a first protrusion between said first aperture and said first slot, said first protrusion creating a narrow passage between said first aperture and said first slot, said narrow passage having a width that is less than a width of said first slot;
   a second protrusion between said second aperture and said second slot, said second protrusion creating a narrow passage between said second aperture and said second slot, said narrow passage having a width that is less than a width of said second slot; and
   a pin extending through said first aperture, said second aperture and a trailer hitch located therebetween, for the purpose of creating an energy-absorbing trailer hitch receiver when said pin travels from said first and second apertures to said first and second slots when subjected to a predetermined level of force.

2. The invention of claim 1 wherein a cross-section of said tube is a shape selected from the group consisting of a circle, oval and polygon.

3. The invention of claim 1 wherein a cross-section of said pin is a shape selected from the group consisting of a circle, oval and polygon.

4. The invention of claim 1 wherein said first protrusion is a set of two protrusions.

5. The invention of claim 1 wherein said second protrusion is a set of two protrusions.

6. The invention of claim 1 wherein said first slot and said second slot each have a pair of oppositely disposed and generally parallel edges.

7. An energy-absorbing trailer hitch receiver tube comprising:
   a first aperture and a second aperture opposite said first aperture;
   a first slot and a second slot opposite said first slot;
   a first protrusion between said first aperture and said first slot, said first protrusion creating a narrow passage between said first aperture and said first slot, said narrow passage having a width that is less than a width of said first slot;
   a second protrusion between said second aperture and said second slot, said second protrusion creating a narrow passage between said second aperture and said second slot, said narrow passage having a width that is less than a width of said second slot; and
   a pin extending through said first aperture, said second aperture and a trailer hitch located therebetween, for the purpose of creating an energy-absorbing trailer hitch receiver when said pin travels from said first and second apertures to said first and second slots when subjected to a predetermined level of force.

8. The invention of claim 7 wherein a cross-section of said tube is a shape selected from the group consisting of a circle, oval and polygon.

9. The invention of claim 7 wherein a cross-section of said pin is a shape selected from the group consisting of a circle, oval and polygon.

10. The invention of claim 7 wherein said first protrusion is a set of two protrusions.

11. The invention of claim 7 wherein said second protrusion is a set of two protrusions.

* * * * *

UNITED STATES PATENT AND TRADEMARK OFFICE
CERTIFICATE OF CORRECTION

PATENT NO.       : 7,641,214 B2
APPLICATION NO.  : 11/432749
DATED            : January 5, 2010
INVENTOR(S)      : Donald Kahl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Sixteenth Day of November, 2010

David J. Kappos
*Director of the United States Patent and Trademark Office*